United States Patent
Watson et al.

(10) Patent No.: US 8,727,767 B2
(45) Date of Patent: May 20, 2014

(54) MULTI-MODE COMBUSTION DEVICE AND METHOD FOR USING THE DEVICE

(75) Inventors: Matthew James Watson, Bethlehem, PA (US); Douglas Jay Strange, Kutztown, PA (US); Joseph Keith Juretus, Quakertown, PA (US); Kevin Alan Lievre, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1162 days.

(21) Appl. No.: 12/688,115

(22) Filed: Jan. 15, 2010

(65) Prior Publication Data

US 2010/0183990 A1 Jul. 22, 2010

Related U.S. Application Data

(60) Provisional application No. 61/145,339, filed on Jan. 16, 2009.

(51) Int. Cl.
| | |
|---|---|
| *F23C 5/02* | (2006.01) |
| *F23C 5/00* | (2006.01) |
| *F23C 5/08* | (2006.01) |
| *F23C 5/14* | (2006.01) |
| *F23M 9/04* | (2006.01) |
| *F23N 1/04* | (2006.01) |

(52) U.S. Cl.
USPC .................................... 431/8; 431/12

(58) Field of Classification Search
USPC ......... 431/159, 174, 181, 186, 187, 189, 202, 431/251, 343, 8, 12
See application file for complete search history.

(56) References Cited

U.S. PATENT DOCUMENTS

| | | | | |
|---|---|---|---|---|
| 2,256,775 | A | * | 9/1941 | Hubbell .......................... 138/89 |
| 2,412,579 | A | * | 12/1946 | Hauzvic ........................ 239/112 |
| 3,049,168 | A | * | 8/1962 | Litwinoff ........................ 431/12 |
| 4,687,235 | A | | 8/1987 | Stoll |
| 4,797,087 | A | | 1/1989 | Gitman |
| 4,830,604 | A | | 5/1989 | Korenberg |
| 4,931,013 | A | | 6/1990 | Brahmbhatt et al. |
| 5,308,239 | A | | 5/1994 | Bazarian et al. |
| 5,516,279 | A | * | 5/1996 | Yap .............................. 431/175 |
| 5,545,031 | A | * | 8/1996 | Joshi et al. ......................... 431/8 |
| 5,601,425 | A | | 2/1997 | Kobayashi et al. |
| 5,611,683 | A | | 3/1997 | Baukal, Jr. et al. |

(Continued)

FOREIGN PATENT DOCUMENTS

| | | |
|---|---|---|
| CN | 1118858 A | 3/1996 |
| CN | 1148151 A | 4/1997 |

(Continued)

*Primary Examiner* — John K Fristoe, Jr.
*Assistant Examiner* — Seth W Mackay-Smith
(74) *Attorney, Agent, or Firm* — Michael K. Boyer; Larry S. Zelson

(57) ABSTRACT

An apparatus for continuation of combustion with a combustion apparatus when the supply of the normal operating oxidant or normal operating fuel is disrupted, or temporally reduced. Air or oxygen enriched air or oxygen and a gaseous fuel or a liquid fuel or both a gaseous and liquid fuel are introduced into the combustion apparatus in place of the normal oxidant-fuel mixture to effect combustion and maintain the heating level in the furnace.

A burner capable of firing in any one of the following nine firing modes: Air-Gas; Air-Oxy-Gas; Oxy-Gas; Air-Oil; Air-Oxy-Oil; Oxy-Oil; Air-Oil-Gas; Air-Oxy-Oil-Gas; Oxy-Oil-Gas.

27 Claims, 12 Drawing Sheets

(56) References Cited

U.S. PATENT DOCUMENTS

| | | |
|---|---|---|
| 5,833,447 A | 11/1998 | Bodelin et al. |
| 5,871,343 A | 2/1999 | Baukal, Jr. et al. |
| 5,904,475 A | 5/1999 | Ding |
| 5,975,886 A | 11/1999 | Philippe |
| 6,031,324 A | 2/2000 | Itaya et al. |
| 6,068,468 A * | 5/2000 | Philippe et al. ............... 431/175 |
| 6,074,197 A | 6/2000 | Philippe |
| 6,126,438 A * | 10/2000 | Joshi et al. .................... 431/161 |
| 6,250,915 B1 | 6/2001 | Satchell, Jr. et al. |
| 6,283,747 B1 | 9/2001 | Legiret et al. |
| 6,331,107 B1 * | 12/2001 | Philippe ........................ 431/285 |
| 6,422,858 B1 | 7/2002 | Chung et al. |
| 6,524,097 B2 * | 2/2003 | Hoke, Jr. et al. ................. 431/8 |
| 6,910,432 B2 * | 6/2005 | D'Agostini et al. ........... 110/348 |
| 7,390,189 B2 | 6/2008 | D'Agostini |
| 7,909,601 B2 | 3/2011 | Stephens et al. |
| 2005/0263225 A1 * | 12/2005 | Dudill et al. ............... 149/109.6 |

FOREIGN PATENT DOCUMENTS

| | | |
|---|---|---|
| CN | 101360951 A | 2/2009 |
| JP | 61180090 A2 | 8/1986 |
| JP | 09-112814 | 5/1997 |
| JP | 2005-003360 | 1/2005 |
| RU | 2101619 C1 | 1/1998 |
| RU | 39685 U1 | 8/2004 |
| RU | 2327927 | 6/2008 |
| SU | 1758340 A1 | 8/1992 |
| TW | 526319 | 4/2003 |
| TW | 200949160 A | 12/2009 |

* cited by examiner

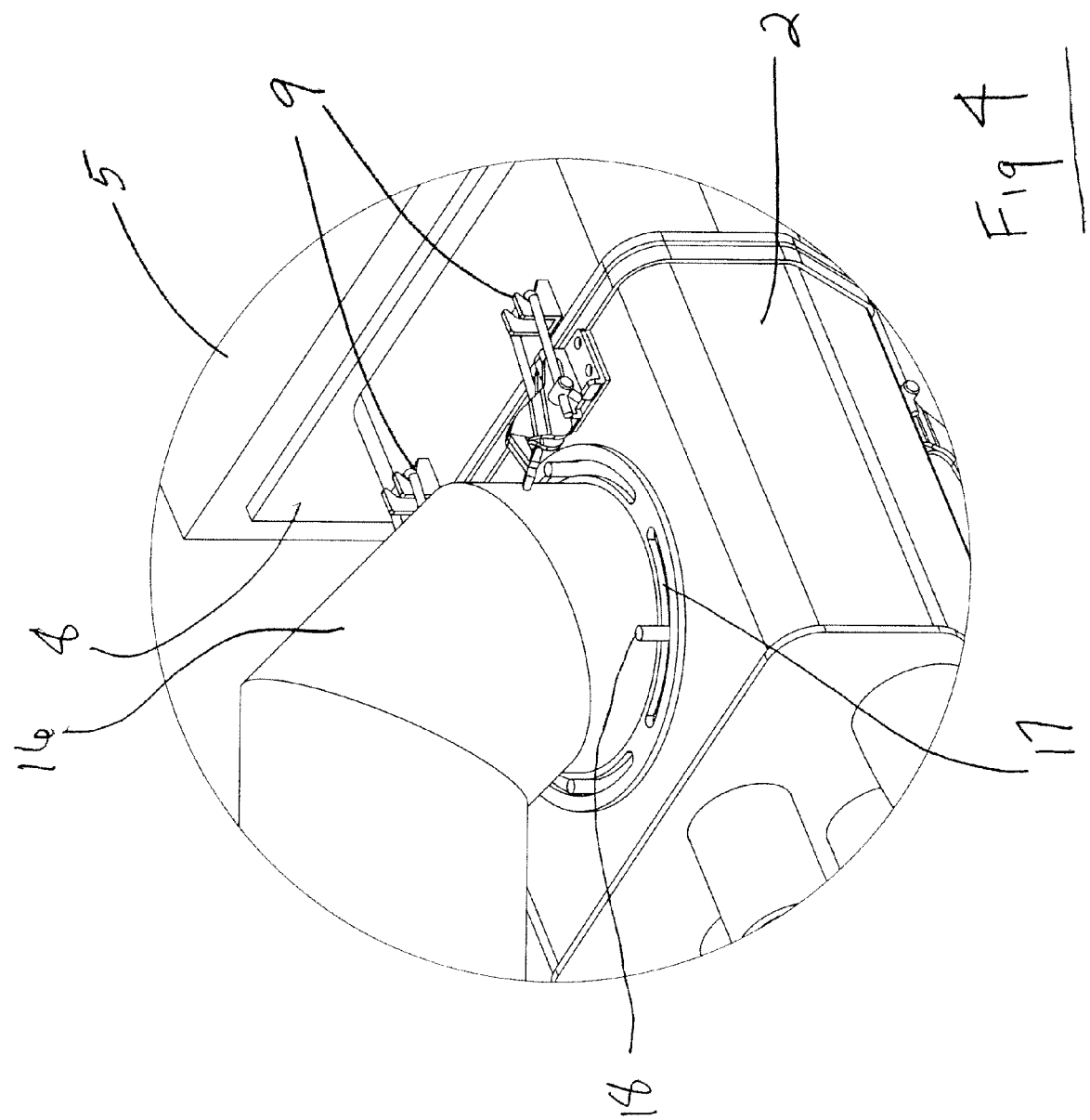

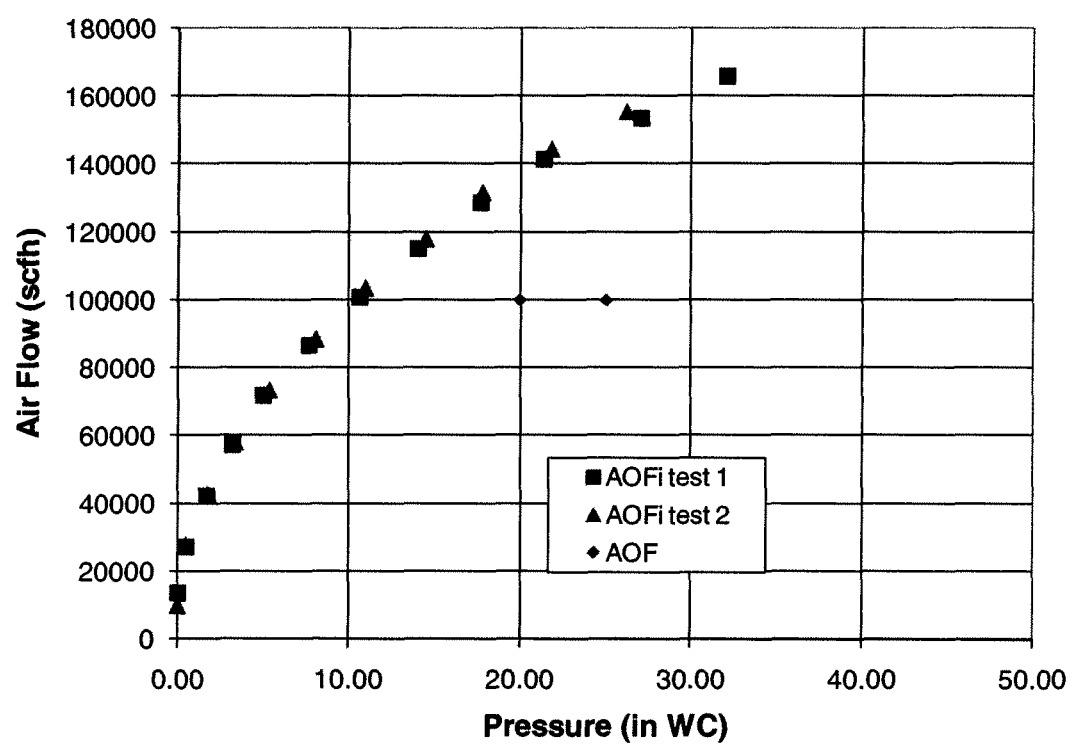
Figure 5: Air Pressure drop data and comparison between this invention (AOFi) and Prior Art (AOF) burner.

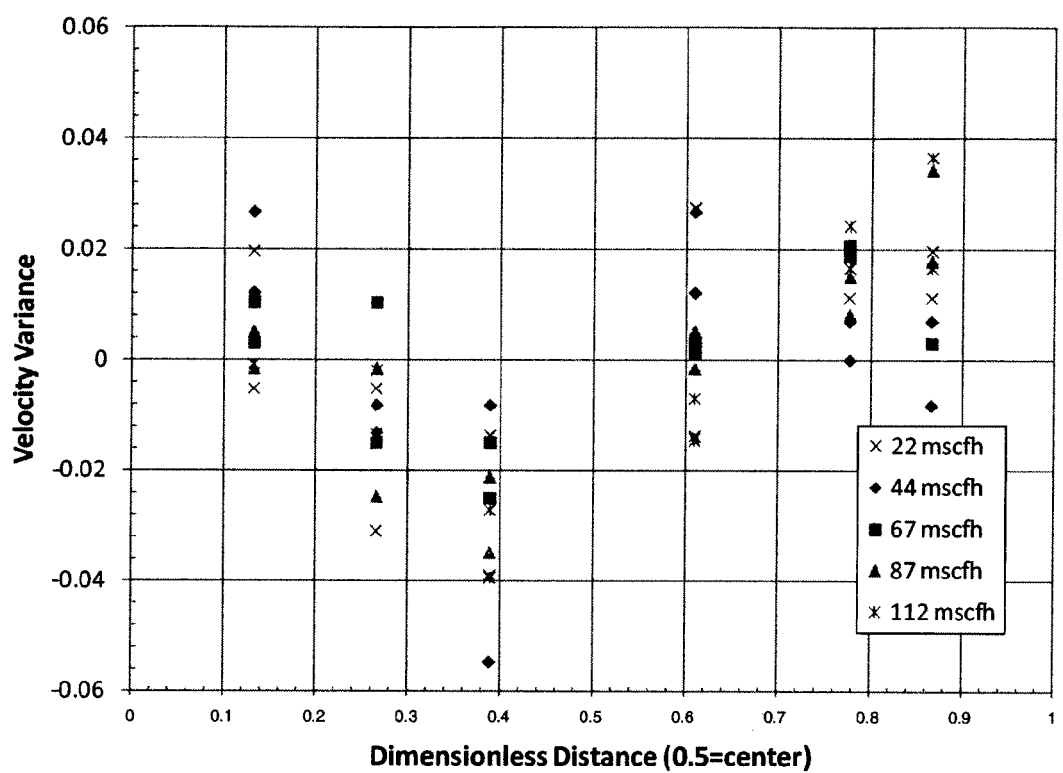
Figure 6: Air velocity variance across the exit plane of the top port (0 degree block with oil lance inserted) showing extremely uniform velocity distribution.

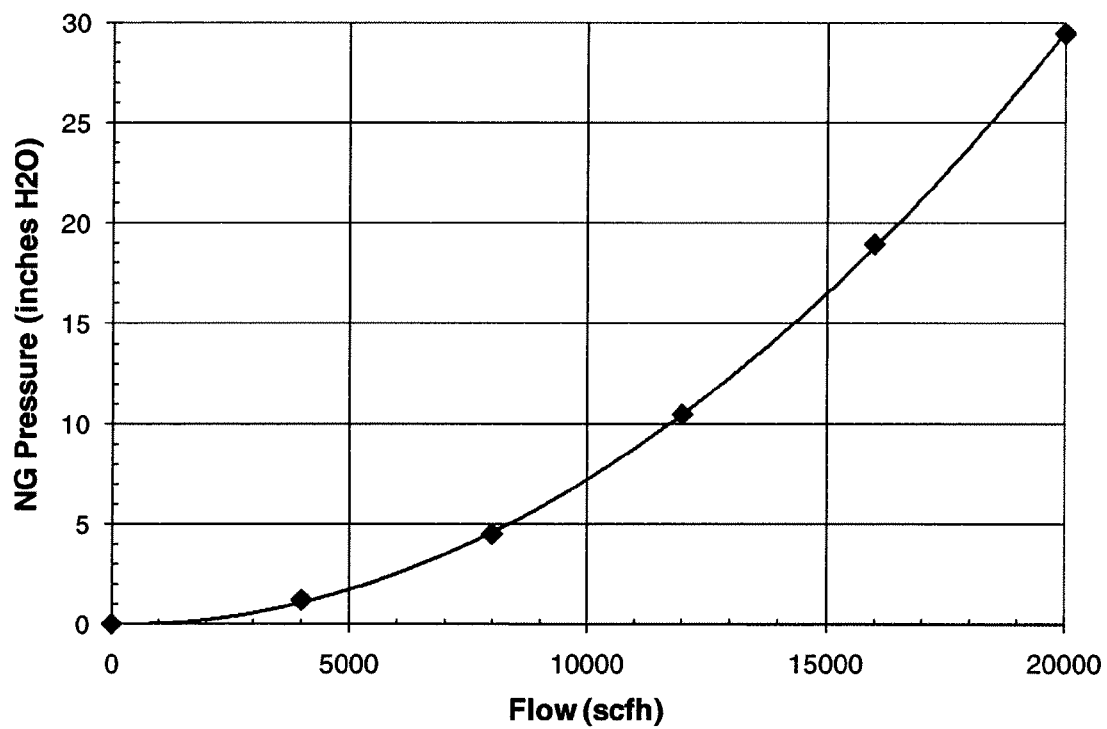
Figure 7: Natural Gas pressure drop data, showing very low NG supply pressure requirement for up to 20MMBTU/hr (20,000 scfh) firing rate.

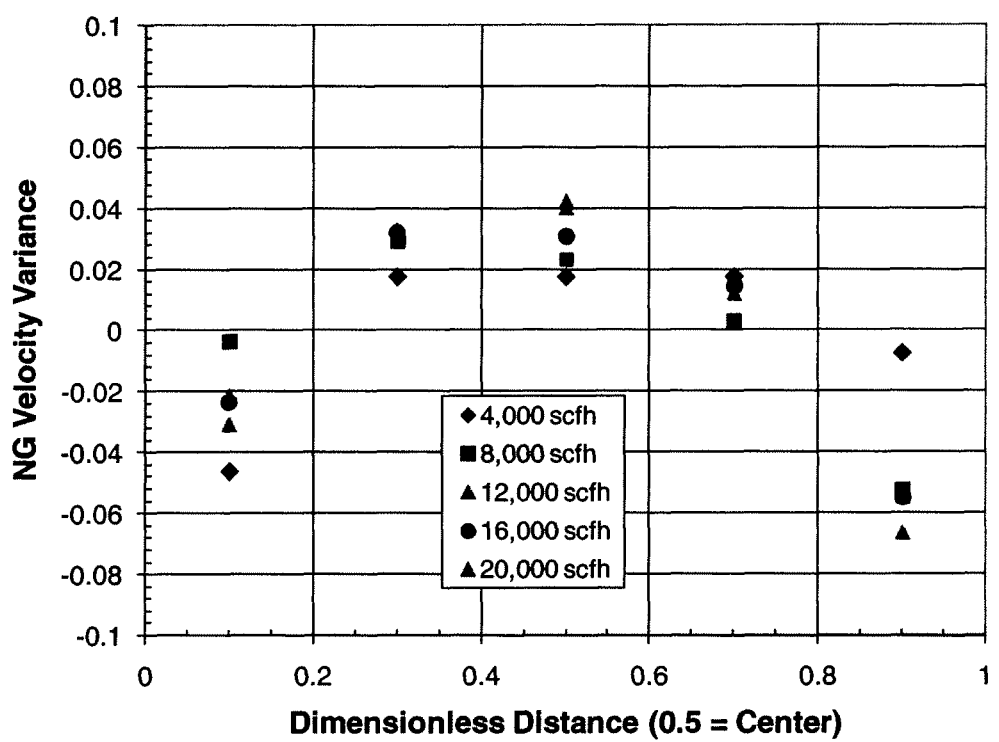
Figure 8: Velocity variance across the exit plane of the NG nozzle showing extremely uniform velocity distribution.

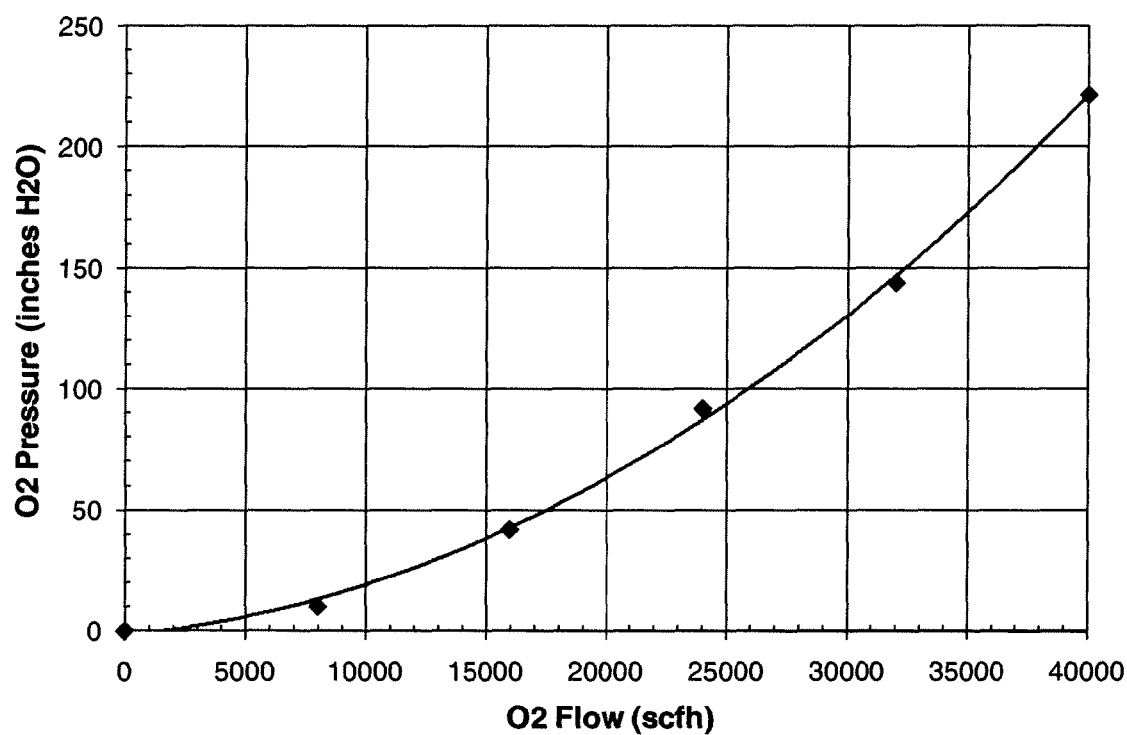
Figure 9: Oxygen pressure requirement.

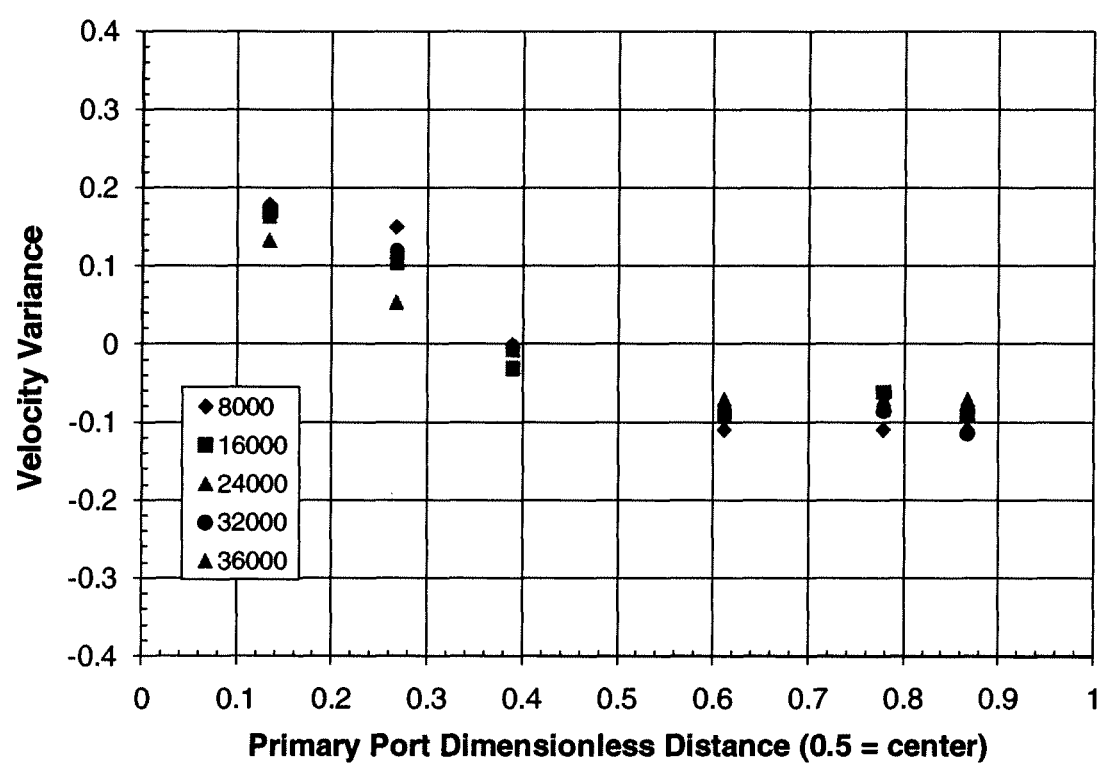
Figure 10: Oxygen flow velocity distribution across the exit face of the primary port.

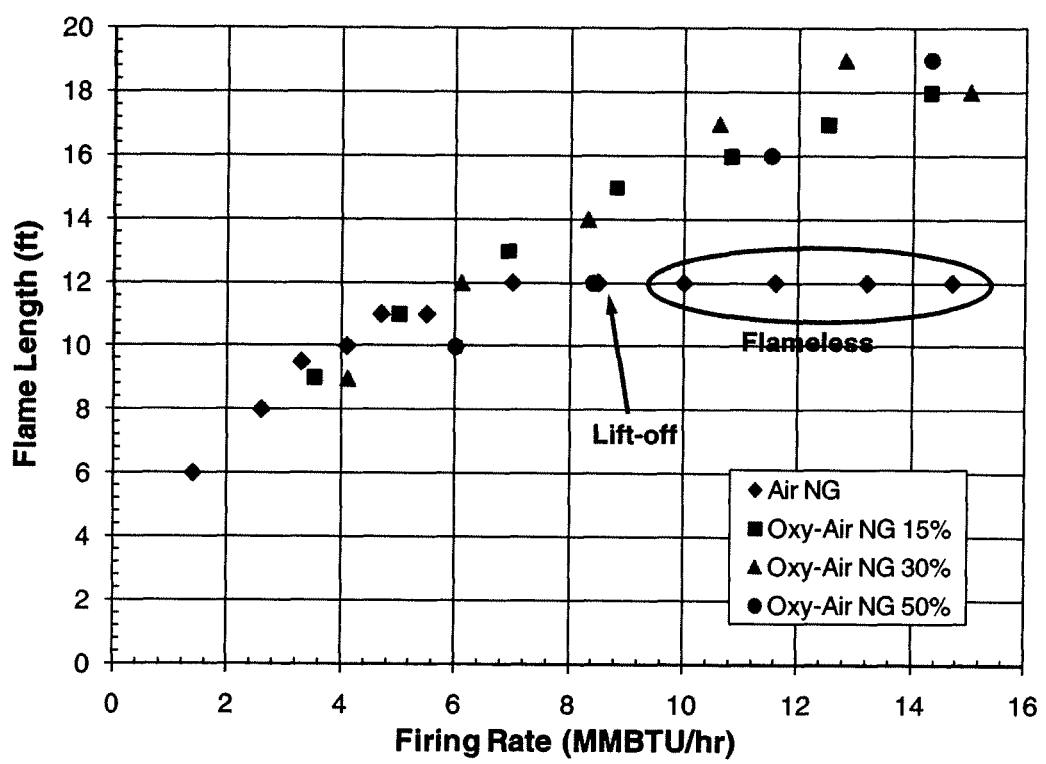
Figure 11: Visible flame length for natural gas firing as a function of firing rate and oxygen concentration in the oxidizer. (i.e. 15% means 15% of the stoichiometric oxygen required for complete combustion is from pure oxygen). Note the transition, in air, from visible to flameless combustion.

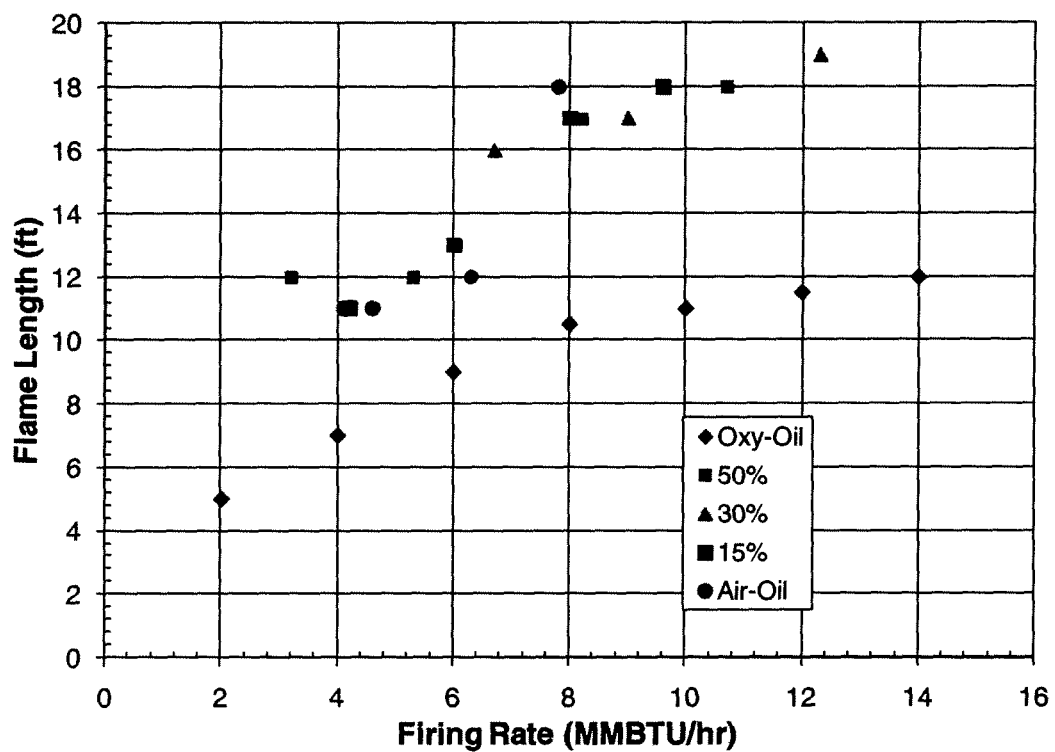
Figure 12: Visible flame length as a function of firing rate and oxygen concentration in the oxidizer. (i.e. 15% means 15% of the stoichiometric oxygen required for complete combustion is from pure oxygen).

MULTI-MODE COMBUSTION DEVICE AND METHOD FOR USING THE DEVICE

CROSS-REFERENCE TO RELATED APPLICATIONS

This application claims the benefit of U.S. Provisional Application No. 61/145,339, filed on Jan. 16, 2009. The disclosure of the Provisional Application is hereby incorporated by reference.

BACKGROUND OF THE INVENTION

The present invention relates to a combustion device for producing elevated temperatures in industrial melting furnaces for such diverse products as metals, glass, ceramic materials, among other materials manufactured or processed in a fluid or molten state.

Examples of conventional combustion devices are described in U.S. Pat. Nos. 6,524,097, 7,390,189, and 7,500,849. The disclosure of the previously identified patents and patent publications is hereby incorporated by reference.

There is a need in this art for a combustion device that is capable of multi-modal operating by employing multiple oxidants and multiple fuel sources.

BRIEF SUMMARY OF THE INVENTION

The instant invention can solve problems associated by the prior art by providing a combustion device that is capable of operating in multiple modes by employing multiple oxidant sources and multiple fuels. The combustion device or burner is capable of running with two oxidant sources (air, oxygen and blends thereof) and two fuel sources (liquid, gaseous and blends thereof) and any combination of one, or the other or both including:

oxy-gas, air-oxy-gas, air-gas
oxy-liquid, air-oxy-liquid, air-liquid
oxy-gas-liquid, air-oxy-gas-liquid, air-gas-liquid As used herein the term "air" or "combustion air" mean atmospheric air as well as oxygen depleted air, such as vitiated air. Oxygen depleted air can comprise greater than 0 to less than about 21 volume percent oxygen (e.g., 10 to less than about 21 volume percent oxygen). As used herein, the term oxygen or O2 means commercially pure oxygen generated by a cryogenic air separation plant or an adsorption process. The oxygen concentration of such oxygen is typically greater than 90% by volume.

In one aspect, the invention relates to a combustion device for continuing combustion in the event of curtailed or terminated availability of the normally utilized oxidant or fuel for the combustion process. In another aspect of the invention, the inventive combustion device permits controlling the characteristics of the flame (e.g., length), and the amount of oxidant supplied (e.g., ranging from oxygen to air) as well as type of fuel (e.g., ranging from gas to liquid). As a result, the inventive device provides the following benefits:

1) Operation as a primary burner either in an air-fuel or oxy-fuel furnace,
2) Operation as a back-up or supplement to an oxy-fuel fired furnace in the event that primary fuel runs out or oxygen supply runs out or runs low,
3) Heating up full oxy-fuel furnace from a cold start,
4) Production flexibility for operations (e.g. aluminum reverb furnace, glass melting furnace, among other furnaces, boilers and stoves),
5) Better flame coverage with flat geometry,
6) Better luminosity and flame stability with precombustor,
7) Maintaining location of foam within an oxy-fuel glass furnace with higher momentum air-fuel or oxygen-enriched air-fuel operation mode,
8) Low pressure drop for air flow enabling the use of a relatively inexpensive blower,
9) Flexibility in operating modes,
10) Capable of replacing existing oxy-fuel burners,
11) Two ports with precombustor allows for more stable combustion up to a defined firing rate. Beyond that, combustion is flameless (and can be used safely once above auto-ignition temperature of the fuel),
12) Ability to fire two fuels simultaneously,
13) Large oxidant momentum range,
14) Controlled operating transition from change of operating mode from liquid fuel to gaseous fuel or vice versa,
15) Ability to transition from change of operating mode from air as oxidant to oxygen as oxidant or vice versa,
16) Reduced Natural Gas (NG) back-pressure requirement,
17) Visible and flameless combustion modes, among other benefits that will become known to a skilled person in this art.

In contrast to conventional devices, the inventive device and methods offer the following advantages over conventional burners:

Better flame coverage with flat geometry
Better luminosity and flame stability with precombustor
Low pressure drop for air flow enabling the use of an inexpensive blower
Maximum flexibility in operating modes
Back-up to the existing burners (e.g., oxy-fuel burners commercially available from Air Products, Allentown, Pa. as Cleanfire® HRi™ oxy-fuel burners)
Very fast replacement of the oxy-fuel burners with the inventive device and vice-versa (e.g., oxy-fuel burners commercially available from Air Products, Allentown, Pa. as Cleanfire® HRi™ oxy-fuel burners)
Two ports with precombustor allows for more stable combustion up to a certain firing rate. Beyond that, combustion is flameless (can be used once above auto-ignition temperature of the fuel)
Ability to fire two fuels simultaneously
Large oxidant momentum range
Smooth operating transition from change of operating mode from liquid fuel to gaseous fuel or vice versa
Smooth operating transition from change of operating mode from air as oxidant to oxygen as oxidant One aspect of the invention relates to a combustion device comprising a refractory block having at least two passages, a burner mounting plate, burner housing, a combustion air inlet, an oxygen inlet, a liquid fuel inlet, and gaseous fuel inlet.

Another aspect of the invention relates to a method for using a combustion device wherein at least one oxidant and at least one fuel are supplied to the combustion device.

A further aspect of the invention relates to a kit for constructing or repairing a combustion device comprising a refractory block, an oil lance, oil plug, oxygen plug, a natural gas plug, air connection assembly, air connection plug, aspirating air lance, gaskets, and quick connect fittings.

BRIEF DESCRIPTION OF SEVERAL VIEWS OF THE DRAWINGS

FIG. 4 is a perspective view of the aspect illustrated in FIG. 3 that shows the connection between the combustion air inlet device housing, FIG. 5 is a graphical representation of the operation of the device that shows the relationship between air flow and pressure, FIG. 6 is a graphical representation of the operation of the device that shows the relationship between velocity of the upper oxidant flow and distance, FIG. 7 is a graphical representation of the operation of the device that shows the relationship between pressure and flow for a natural gas fuel, FIG. 8 is a graphical representation of the operation of the device that shows the relationship between velocity of natural gas fuel and distance, FIG. 9 is a graphical representation of the operation of the device that shows there relationship between pressure and flow for air, FIG. 10 is a graphical representation of the operation of the device that shows the relationship between velocity of an upper oxidant comprising oxygen and distance, FIG. 11 is a graphical representation of the operation of the device during combustion that shows the relationship between flame length and natural gas firing rate, FIG. 12 is a graphical representation of the operation of the device during combustion that shows the relationship between flame length and oil firing rate.

Wherever possible, the same reference numbers will be used throughout the drawings to represent the same parts. The drawings are not to scale and the relative orientations of components in the drawings are for illustration purposes only.

DETAILED DESCRIPTION OF THE INVENTION

The instant invention relates to a combustion device and method for using the device. The device can be installed in a desirable location of a furnace, and operated in a manner that permits controllably varying the characteristics of the flame produced by the device as well as amount of oxygen and type of fuel combusted (e.g., the invention permits using a range of oxygen amounts as well as a mixture or range of liquid to gaseous fuels). The inventive method can be performed by choosing the amount of oxygen to be combusted which can range from oxygen to air to oxygen depleted air (e.g., vitiated air) and all variations therebetween. The inventive method can also be performed by choosing the concentration of oxygen in combination with the type of fuel combusted which fuel can range from gaseous to liquid to mixtures of gas and liquid and all variations therebetween.

The inventive combustion device comprises a refractory block, a burner mounting plate, burner housing, a combustion air inlet, oxygen inlet, oxygen diffuser, liquid fuel inlet, and gaseous fuel inlet. The combustion device can also comprise locking clips so that the combustion device can be quickly removed for replacement or maintenance. The orientation of the combustion air supply relative to the combustion air inlet can swivel in order to accommodate adjacent equipment. Depending upon the mode of operation, one or more of the oxidant inlets and/or one or more of the fuel inlets can be plugged (e.g., in the event the oxidant or fuel is not being used).

The refractory block typically comprises materials used for natural gas or oil burners as described in U.S. Pat. No. 7,390,189. While any suitable refractory material can be employed, examples of suitable materials comprise fuse-cast composite of alumina, silica and zirconia.

Figure 1:
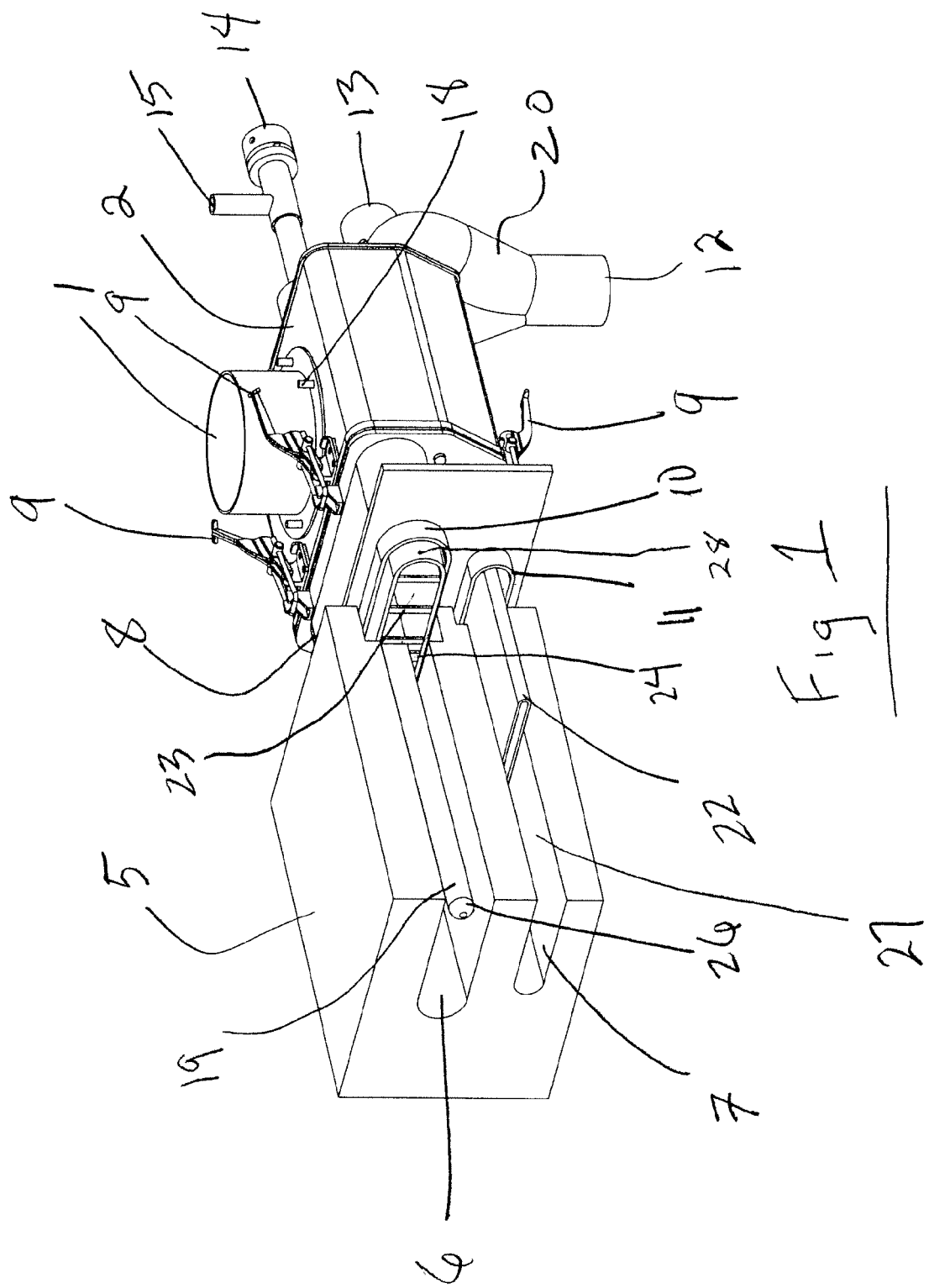
FIG. 1 is a perspective view of one aspect of the inventive combustion device.
Figure 2:
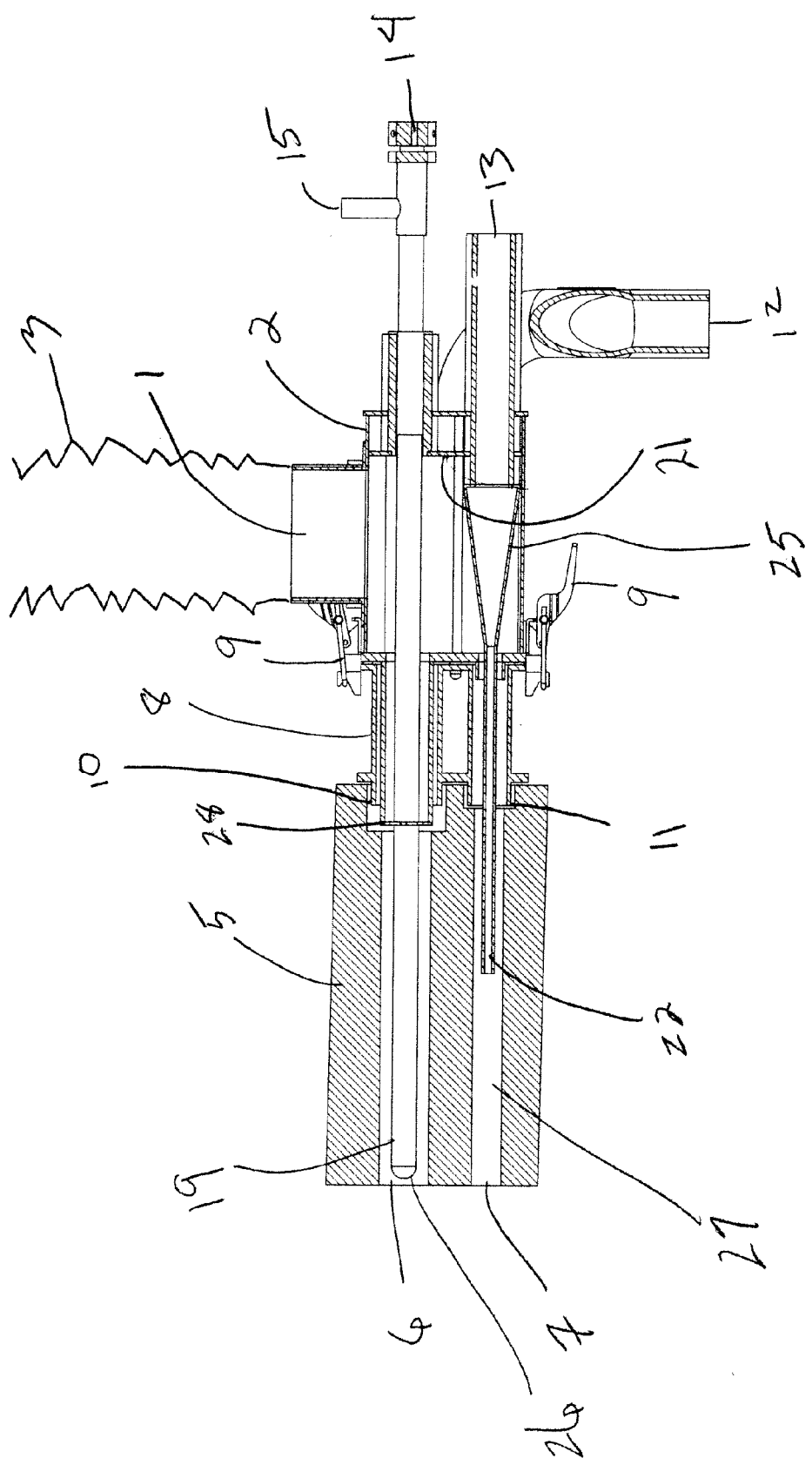
FIG. 2 is a sectional view of the aspect illustrated in FIG. 1.

As illustrated in FIGS. 1 and 2, the refractory block 5 defines two channels or passages 6 and 7 for fluid flow (e.g., an upper and a lower channel can be used for supplying oxidant and fuel). The liquid fuel and primary oxidant may be delivered to the top passage 6. Staged, secondary oxidant and gaseous fuel may be delivered to the bottom passage 7 when the burner block 5 is used in conjunction with a gas or oil burner. Alternatively, the delivery or supply of liquid and gaseous fuels can be reversed.

In an aspect of the invention, when the device is used as an oxygen fuel burner, the top passage 6 defined within the refractory block 5 is the location of the oil lance (if used) and approximately 70% of the oxidant flow is delivered to the top passage 6. Gaseous fuel (if used) and the balance of oxidant are delivered to the bottom passage 7. Alternatively, the delivery or supply of liquid and gaseous fuels can be reversed.

The burner mounting plate 8 can comprise the burner mounting plate as described in the aforementioned patents, and typically is made from stainless steel. The burner mounting plate 8 is affixed to the refractory block 5 by any conventional means, for example by using a tee bolt and nut arrangement (not shown). The burner housing 2 is affixed to the burner mounting plate 8 by using removable locking clips 9. Usage of locking clips 9 has the advantage of allowing fast interchange among various types of burners depending on the operators desired operating mode (e.g., the mounting plate does not need to be changed for each burner, and the burner connection to the mounting plate is simply made with 4 locking clips). The burner mounting plate 8 has top and bottom ports 10 and 11 in fluid communication with the top and bottom ports of the refractory block 5 and in turn passages 6 and 7, respectively.

The burner housing 2 is typically fabricated from stainless steel. The burner housing 2 has a number of connection port inlets: the oxygen inlet 12; the gaseous fuel inlet 13, the liquid fuel inlet 14, the atomizing gas inlet 15 (e.g., for the situation when an atomizing gas assisted liquid fuel atomizer is used), and the air inlet 1.

Figure 3:
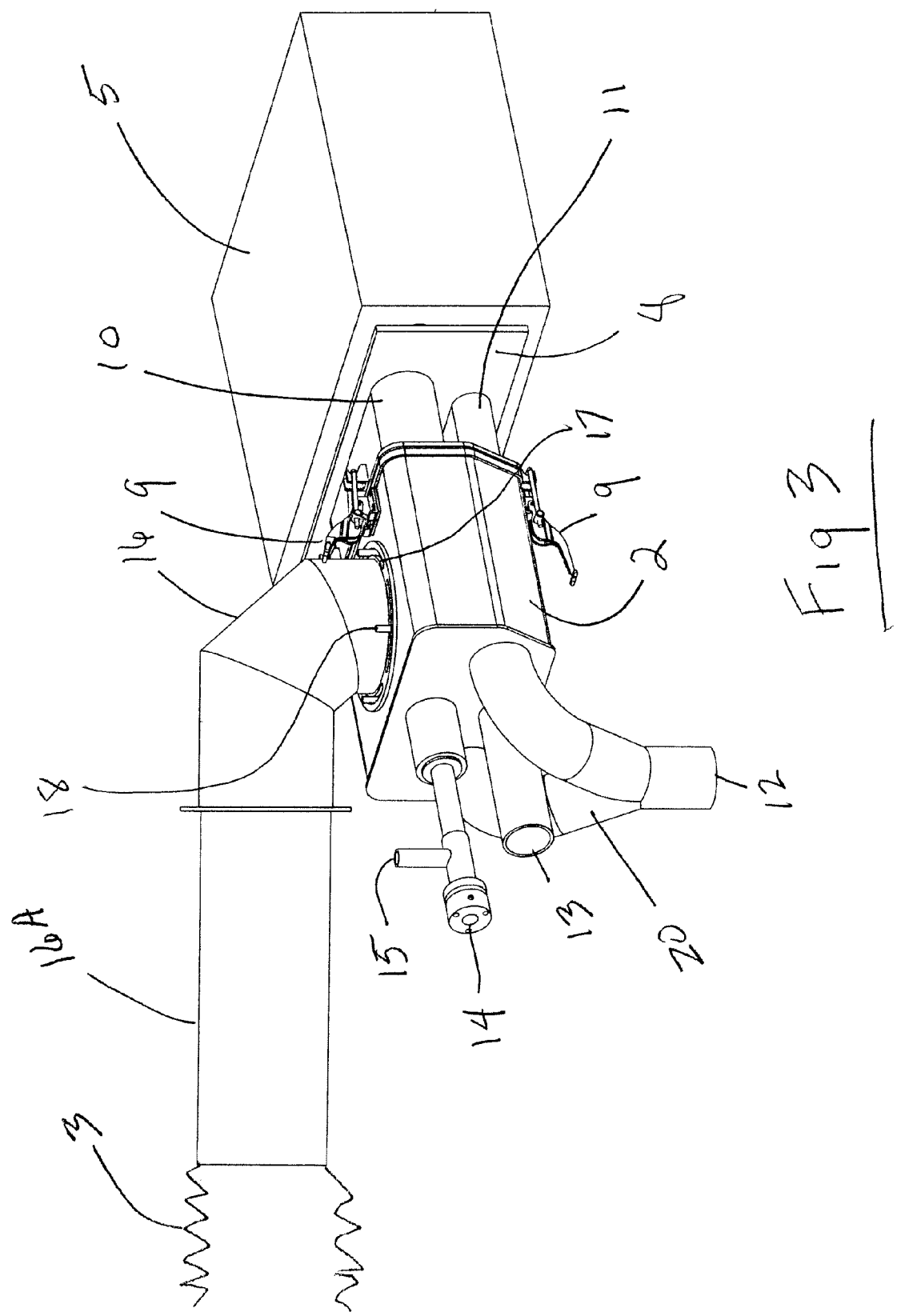
FIG. 3 is a perspective view of the aspect illustrated in FIG. 1 that shows the device from the side opposite of the flame (or the side outside of a furnace)

The oxygen inlet 12 can be located at any suitable location (e.g., the oxygen inlet can be located in a position 2.5 inches lower than that of described in U.S. Pat. No. '189). Referring now to FIGS. 2 and 3, typically the last few feet of oxidant (e.g., via inlets 1 and 12 and fuel supply (e.g., via inlets 13 and 14) to a burner are made with a relatively flexible hose (not shown). The proximity of the air, oxygen, gas, liquid fuel, and, when used, atomizing gas supply lines to the inventive burner and usage of a flexible hose typically means no special equipment is needed to connect or remove the inventive device.

In another aspect of the invention, the supply lines which are not employed can be capped or shut-down and, if subsequently desired, reconnected or turned back on. For example, in the event that air or vitiated air is employed as the sole oxidant, the oxygen supply can be closed or capped. Likewise, each inlet to the burner, when not connected to a fuel, atomizing gas or oxidant supply line shall be capped off. For example, in the event that air or vitiated air is employed as the sole oxidant, and the oxygen supply line is disconnected from the burner, the oxygen inlet 12 shall be closed or capped.

Referring now to FIGS. 1, 2, 3 and 4, the combustion air or vitiated air inlet 1 is located on the top of the burner housing 2. Typically, combustion air or vitiated air is supplied to the burner via a low pressure, high volumetric fan or blower. If desired, the pressure or volume of combustion air can be increased by using a compressor (e.g., a commercially available compressor—not shown). The connection of the combustion air supply, as shown in FIGS. 2, 3 and 4, allows for a flexible air hose, such as a spiral wound duct hose 3 to be connected to the combustion air supply with a conventional hose clamp (not shown). The size of the air inlet 1 and supply 3 depends on the size of the burner, but is typically designed to be as large as possible, to minimize pressure drop, but the diameter is rounded to the most common duct hose size.

One embodiment, shown in FIGS. 3 and 4 allows for faster connection of the combustion air supply to the burner housing through an elbow 16, such as a mitered elbow, located on the top of the burner. The use of an elbow 16 helps to minimize the height requirement above the burner for a connection to a combustion air or vitiated air supply. A transition piece 16A may be used between the elbow 16 and the combustion air or vitiated air supply duct hose 3. The transition piece 16A may be permanently connected to the end of the duct hose 3, and allows for the use of a quick connection to the elbow 16, via a commonly used connection device such as a cam-lock fitting, quick-connect fitting, j-hook or other arrangement (not shown). The rounding to the most common duct hose size can be made by a change in diameter in the transition piece 16A. That is, the connection of the transition piece 16A to the burner elbow 16 is made with two conventional locking clips (not shown). In addition, the elbow may be designed such that there are twice as many holes or slots 17 as there are fasteners or studs 18 in the burner. This can allows the plane of the inlet air to be set parallel, or 30, 60, or 90 degrees either side of the plane of the fuel inlet 14. Alternatively the holes may be slotted to allow the plane of the inlet air to be set to any angle relative to the plane of the fuel inlet.

Referring to FIGS. 1 and 2, the liquid fuel or oil (e.g., #2 heating oil or #6 heavy fuel oil) is supplied via the fuel oil inlet 14 to an oil lance 19 located within the upper passage 6 defined in the refractory block 5. For the case where an atomizing gas-assisted liquid fuel atomizer is used, an atomizing gas is supplied via an inlet 15 that is located above the oil inlet 14 (otherwise it would impinge on the gaseous fuel connection). If desired, the location of oil lance 19 can be adjusted relative to the refractory block 5 by sliding the oil lance 19 further into or out of passage 6 within block 5. If the oil is not used, then connection is capped off. Alternatively the oil lance assembly 19 can be removed, and replaced with a plug. Alternatively the oil lance assembly 19 can be removed, and replaced with a lance and nozzle assembly designed to deliver a compressed air stream near the exit of the passage 6, which is designed to boost the combustion air delivery to the burner. This is desirable because low pressure fans or blowers are typically favored by industry due to their lower cost, but because of the low delivery pressure, the amount of combustion air or vitiated air which can be delivered into the combustion space may be limited, which in turn can limit the thermal power delivered by the burner. The addition of a compressed air stream as described here has the effect of increasing the maximum thermal power delivery to the furnace from the burner. If oil is not used and the lance 19 remains in place, then it is useful to continue to run atomization gas through the lance 19 to prevent the lance from overheating. While any suitable oil lance can be employed, an example of an oil lance used in this burner can comprise a lance having a generally circular cross-section such as can be found in U.S. Pat. No. 7,500,849; hereby incorporated by reference.

Referring to FIGS. 1, 2 and 3, oxygen, if used, enters the inlet port 12, and flow is split in the "Y" 20. The split O2 flow enters the burner housing 2 through two ports. Once inside the burner, O2 flow is evenly distributed through a diffuser plate 21. This helps to ensure relatively even flow velocity distributions across the exit plane of the top passage 6 and the annular flow space surrounding a gaseous fuel nozzle 22 in the bottom passage 7, and helps the O2 to mix with combustion air (if used) from inlet 1. While the gaseous fuel nozzle 22 can have any suitable configuration, the gaseous fuel nozzle will normally have a generally rectangular cross-section.

Referring to FIGS. 1, 2, 3 and 4, combustion air, if used, enters the burner through the inlet connection 1. If oxygen is added (e.g., via inlet 12), the air will mix with the oxygen as it flows out of the holes of the diffuser plate 21. The oxidant then flows out of the primary oxidant nozzle 28 and the annular space between the fuel nozzle 22 and the bottom passage 7, via the burner mounting plate 8 on the bottom port 11. In one embodiment, approximately 70% of the oxidant flow is directed to the top passage or port 6 defined in the refractory block 5, and the balance to the bottom port or passage 7. The flow distribution can be adjust by use of a device (not shown) to partially block one or the other or both of the ports. The advantage to this is that it can be used to change the characteristics of the flame. One possible disadvantage to this arrangement is that it may decrease the area available for flow and increase the pressure requirement of oxidant delivery to the burner.

Substantially evenly distributed flow occurs in the bottom passage 7 as the oxidant flows around the natural gas nozzle 22, as there is typically a considerable reduction in flow cross sectional area as the oxidant gas or gases flow from the inlet ports 1 and 12 to the annular space between the passage 7 and the fuel nozzle 22 upon entry into the bottom port 7. However, for the top passage 6, the flow typically is redistributed before exiting the oxidant nozzle 28. This is achieved through the use of flow distribution bars 23 spaced evening across the width of the oxidant nozzle 28 (e.g., shown in FIG. 1 wherein the oil lance 19 extends between two of the distribution bars 23) and can rests on a tab 24 to help maintain its central location with respect to top port 10 and nozzle 28.

Gaseous fuel, if used, enters the burner through the gaseous fuel inlet 13 connection. The gaseous fuel passes through a round to flat transition region 25 (as shown in FIG. 2) and into a flat flame nozzle 22. The nozzle 22 protrudes into the refractory block 5 but does not extend into the refractory block 5 as far as the oil lance or emulsion nozzle 19). Because of the nature of design of the gas nozzle 22, the pressure drop through the round to flat transition piece 25 is minimal, while simultaneously ensuring a substantially even flow distribution across the face of the nozzle 22. If gaseous fuel is not used, the gaseous fuel supply may be disconnected and supplemental oxidant can be optionally connected to the gaseous fuel nozzle.

Upon entry into the top port of the refractory block 5, the re-distributed oxidant gases flow along the upper oxidant passage 6. If a liquid fuel lance 19 is used, the oxidant gases mix with and combust the liquid fuel. For the case where combustion occurs in air or vitiated air operation and the furnace is below the auto-ignition point of the fuel, a pilot flame is recommended to maintain a stable flame, i.e. the flame will attach to the pilot. When the furnace operates above the auto-ignition point of the fuel, a pilot flame is not required. As the concentration of oxygen is increased, the distance between the atomized fuel nozzle tip 26 and the onset of visible combustion typically becomes shorter, until the flame becomes attached at relatively high levels of enrichment. The oxidant gases, and liquid fuel spray (if any) enter the furnace and combustion ensues.

If, instead of an oil lance 19, a compressed air nozzle is used, or some other nozzle for the delivery of a high velocity jet of gas is used, this will help to lower the pressure requirement of the oxidant gases flowing through the top refractory passage 6 by taking advantage of the Venturi effect and inspiriting addition oxidant gas into the top refractory passage of the burner.

Even flow distribution of the gases in each of the refractory passages is important because it helps to eliminate the formation of hot spots on the inner surface of the refractory ports. This can be caused by excessive mixing of the gaseous fuel and oxidant inside of the refractory passage, which can result in flame impingement inside the refractory block. It also helps to evenly distribute the flame: both liquid-fuel flame from the top passage and gaseous-fuel flame from the bottom passage.

In one aspect of the invention, the proportion of oxidant flow in one refractory passage is not equivalent to the other refractory passage. While the ratio of oxidant flow in the passages can be varied, normally the oxidant flow through the passage associated with the liquid fuel or oil lance will depend on the available supply pressure of oxidant and the available area for flow of oxidant in the burner and passages associated with the oil lance and gaseous fuel nozzle. In this aspect, a range of about 5 to about 95 percent of the oxidant flows through the passage associated with the oil lance (e.g., about 70%).

In the bottom refractory passage 7, the oxidant gases are kept separated from the gaseous fuel by the flattened fuel nozzle 22. At some point down the refractory passage 7, when the fuel nozzle 22 terminates, the fuel and oxidant come into contact, and a flame sheet is formed between the central fuel flow and annular oxidant flow, in a precombustor region 27 of the bottom refractory passage 7. Except at very high oxidant velocities, where the flame is either lifted off from the tip of the fuel nozzle 22 or is essentially invisible to the naked eye, the flame is anchored within the precombustor 27, which helps to stabilize the flame, especially when combustion air is used and the furnace temperature is below the autoignition temperature of the fuel.

In another aspect of the invention, the shear ratio (or velocity ratio) between oxidant and fuel is controlled. As illustrated by Table 1 below, typically the shear ratios are controlled in order to avoid significant differences in the ratios (e.g., a shear ratio between about 0.8 to about 4.0 is normally desirable). For example if the difference in ratios is more than about 4 and less than about 0.8, then excessive mixing of fuel and oxidant in the precombustor can occur thereby generating too much heat, and not enough soot for a luminous (bright yellow) flame.

TABLE 1

Comparison of NG:oxidizer shear ratio with HRi burner

| Configuration | Min/Max | Shear ratio |
|---|---|---|
| Inventive Burner with O2 and NG | Max shear | 4.03 |
| HRi ™ with wide open staging valve | Max shear | 4.04 |
| Inventive Burner with air and NG | Min shear | 0.85 |
| HRi ™ with staging valve closed | Min shear | 0.83 |

In another aspect of the invention, the invention relates to a kit that contains components for maintaining or repairing the inventive combustion device. The kit can comprise a refractory block, an oil lance, oil plug, oxygen plug, a natural gas plug, air connection assembly, air connection plug, aspirating air lance, gaskets, and quick connect fittings. The gaskets can be fabricated from any suitable material such as refractory paper for the burner to mounting plate and mounting plate to refractory block interfaces and polymeric materials for the oxidant and fuel connections to the burner, as appropriate for material compatibility issues. The quick connect fittings can comprise spring clips, cam-lock connections, hydraulic connections, j-hooks, among other suitable fasteners and fittings.

The following Examples are provided to illustrate certain aspects of the invention and shall not limit the scope of any claims appended hereto.

EXAMPLES

Referring now to FIGS. 5 through 12, these Figures contain graphical representations of data illustrating how the inventive device can be operated.

FIGS. 5, 6, 7, 8, 9, and 10 are results of tests that were conducted without firing the device and under ambient conditions and using air to characterize the pressure drop and velocity profiles.

Referring now to FIGS. 5 and 7, the data shown in FIGS. 5 and 7 is the result of testing that was conducted using the device illustrated in FIG. 1 and shows the relationship between pressure drop across the device and flow. In the case of FIG. 5, the pressure drop is measured from the combustion air inlet (e.g., inlet 1 shown in FIG. 1) and the ambient pressure surrounding the device. In the case of FIG. 7, the pressure drop is measured between the gaseous fuel inlet (e.g., inlet 13 shown in FIG. 1) and the ambient pressure surrounding the device. A conventional method using a commercially available venturi (Model 2300, Lambda Square, N.Y.), and measuring the pressures and gas temperatures, was used to determine the flow of oxidant in FIG. 5 using a method such as that described in Perry's Chemical Engineer's handbook (Perry, R. H.; Green, D. W. (1997). Perry's Chemical Engineers' Handbook (7th Edition). McGraw-Hill. Pp 10-13 & 10-14) was employed for measuring the flow of oxidant in FIG. 5. The data shown in FIG. 7 was generated in the same manner as that of FIG. 5 with the exception that the flow of gaseous fuel was measured in accordance with conventional methods (either an orifice meter or a vortex shedding meter) and with a commercially available flow measuring device.

A pressure drop of between 0 to about 35 inches of water column at combustion air flow of 0 to about 170,000 scfh (standard conditions are 70 deg F. and 14.7 psia) and a pressure drop of between about 0 to about 29 inches of water column at a gaseous fuel flow of about 0 to about 20000 scfh were measured. An oxidant pressure drop between 0 to about 35 inches of water column is desirable in order to be able to supply the burner with air or vitiated air using a relatively low cost fan (e.g., a fan can generate large volumetric flows at a relatively low supply pressure). A gaseous fuel pressure drop between about 0 to about 29 inches of water column is desirable in order to decrease the required supply pressure of gaseous fuel to the burner. This is useful because in some regions of the world, the supply pressure of gaseous fuel at the burner is only 1 or 2 psig.

Referring now to FIGS. 6 and 8, these Figures are a graphical representation of the operation of the device of FIG. 1 that shows the relationship between velocity of the upper oxidant flow and distance across the face of the upper port and the relationship between the velocity of natural gas in the NG nozzle and distance across the exit plane of the nozzle, respectively. These Figures illustrate that there is relatively even flow of material which results in more controlled and even combustion. A velocity variance of about −0.2 to about 0.2 across the upper port is desirable in order to create a symmetrical flat flame and prevent excess velocity shear (outside the range of 0.5 to 5 and preferably 0.8 to 4) which results in the formation of hot spots inside of the precombustor because of excessive mixing of fuel and oxidant inside the precombustor chamber, and a velocity variance of about −0.2 to about 0.2 across the gaseous fuel nozzle is desirable for same reasons as outlined above for the oxidant. The data shown in FIG. 6 and FIG. 8 was generated by using a Pitot tube and hot-wire anemometer in accordance with conventional methods.

FIG. 9 is a graphical representation of the operation of the device of FIG. 1 that shows the relationship between pressure and flow of air (used as an analog fluid in place of oxygen) in the oxygen inlet port. The data shown in FIG. 9 was generated in the same manner as that of FIG. 5 with the exception that the flow was measured with a commercially available flow meter. An oxidant pressure of about 0 to about 225 inches of water column at a flow rate of about 0 to about 40,000 scfh is desirable in order to have a low pressure oxygen supply system (e.g., oxygen supplied from an adsorption-based air separation unit), without the use of a pressure boosting device (e.g., a fan or a pump, which adds capital and operating costs to the air separation unit).

FIG. 10 is a graphical representation of the operation of the device of FIG. 1 that shows the relationship between velocity of an upper oxidant comprising oxygen and distance across the exit face of the primary port. The data shown in FIG. 10 was generated in the same manner as that of FIG. 6. A velocity variance of about −0.2 to about 0.2 is desirable in order to create a symmetrical flat flame and prevent excess velocity shear which results in the formation of hot spots inside of the precombustor because of excessive mixing of fuel and oxidant inside the precombustor chamber.

FIG. 11 is a graphical representation of the operation of the device during combustion that shows the relationship between flame length and natural gas firing rate. The reference to percent (%) in the plot's legend refers to the amount of stoichiometric oxygen required for combustion that is supplied by air or oxygen (e.g., 15% means that 15% of the oxygen required is supplied by O2 and 85% is supplied by air, for an overall oxygen concentration of 32.85%). FIG. 11 illustrates how the inventive method can be conducted by using varying amounts of fuel in order to achieve a desired flame length and firing rate. A flame length of about 0 to about 20 feet and a firing rate of about 0 to about 15 MMBTU/hr are desirable in order to produce molten materials in industrial melting furnaces, to maintain the temperature inside an industrial melting furnace, and/or to prevent foam, scum and other undesirable portions of the molten material from being transported to close to the furnace exit (e.g., in a glass melting furnace these portions can produce a decrease in quality of glass for example, such as excessive bubbles in the final glass product). In addition the length of the flame can be decreased to prevent flame impingement of the flame on the opposing side wall of the furnace. Flame impingement can damage the refractory of the furnace. FIG. 11 also illustrates how the inventive method can be conducted with a range of oxidant oxygen concentrations. An oxidant oxygen volumetric concentration of about 10% to 100% is desirable in order to allow for flexibility of operation, allowing for the use of vitiated air (less than about 21% oxygen), air (about 21% oxygen), oxygen enriched air (about 21% oxygen to about 90% oxygen), and oxygen from an air separation unit, or supplied (about 90 to 100%). The reference to "lift-off" indicates that the root or base of the flame has moved beyond the surface of the refractory block (e.g., there is a visual gap between the flame and the block). The reference to "flameless" means that combustion is occurring without a flame that is visually detectable.

FIG. 12 is a graphical representation of the operation of the device of FIG. 1 during combustion that shows the relationship between visible flame length and oil firing rate. Number 2 heating oil was employed. The reference to percent Oxy-Oil refers to the amount of stoichiometric oxygen required for combustion that is supplied by air or oxygen (e.g., 15% means that 15% of the oxygen required is supplied by O2 and 85% is supplied by air). A flame length of about 0 to about 20 feet and a firing rate of about 0 to about 15 MMBTU/hr is desirable in order to in order to produce molten materials in industrial melting furnaces, to maintain the temperature inside an industrial melting furnace, and/or to prevent foam, scum and other undesirable portions of the molten material from being transported to close to the furnace exit (e.g., these undesired portions can produce a decrease in quality of glass for example, such as excessive bubbles in the final glass product). In addition the length of the flame can be decreased to prevent flame impingement of the flame on the opposing side wall of the furnace. Flame impingement can damage the refractory of the furnace.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A combustion device comprising a refractory block having two passages including a top passage and a bottom passage, a burner mounting plate affixed to the refractory block, and a burner housing affixed to the burner mounting plate, the burner housing having a combustion air inlet, an oxygen inlet, a liquid fuel inlet, and gaseous fuel inlet;
    wherein the burner housing is configured to mix air provided to the air inlet and oxygen provided to the oxygen inlet to form an oxidant and to direct the oxidant to both of the two passages in the refractory block; and
    wherein the burner housing is configured to direct liquid fuel to one of the at least-two passages and gaseous fuel to the other of the two passages.

2. The combustion device of claim 1 further comprising a combustion air supply and wherein combustion air supply can be adjusted relative to the burner housing.

3. The combustion device of claim 1 further comprising a combustion air supply removably connected to the combustion air inlet, an oxygen supply removably connected to the oxygen inlet, a liquid fuel supply removably connected to the liquid fuel inlet and a gaseous fuel supply removably connected to the gaseous fuel inlet.

4. The combustion device of claim 1 wherein the liquid fuel inlet is in fluid communication with a lance that is located within a one of the top passage and the bottom passage defined in the refractory block.

5. The combustion device of claim 4 further comprising an atomizing gas inlet for introducing air into the liquid fuel.

6. The combustion device of claim 1 wherein air is supplied to the combustion air inlet via a fan or blower.

7. The combustion device of claim 4 wherein the gaseous fuel supply is in fluid communication with a nozzle located in the other of the top passage and the bottom passage defined in the refractory block.

8. The combustion device of claim 7 wherein at least one of the oxygen inlet and combustion air inlet are in fluid communication with the top and bottom passages.

9. The combustion device of claim 1 further comprising a diffuser.

10. The combustion device of claim 1 wherein supplemental oxidant is supplied to the gaseous fuel inlet.

11. The combustion device of claim 1 wherein the passages have a generally rectangular cross-section.

12. A method for combusting at least one of gaseous and liquid fuels using the device of claim 1, the method comprising:
supplying an oxidant to at least one of the air inlet and the oxygen inlet; and
supplying at least one of gaseous fuel to the gaseous fuel inlet and liquid fuel to the liquid fuel inlet.

13. The method of claim 12 wherein said method comprises combusting at least one fuel and at least one oxidant source selected from the group consisting of oxygen, air and vitiated air.

14. The method of claim 12 wherein said method further comprises using heat generated from said combusting to heat a furnace.

15. The method of claim 14 wherein said heat is not the primary source of heat to the furnace.

16. The method of claim 12 further comprising alternating between using liquid and gaseous fuels.

17. The method of claim 12 further comprising alternating between using air and oxygen.

18. The method of claim 12 further comprising using liquid and gaseous fuels, and air and oxygen, or using liquid and gaseous fuels, and vitiated air and oxygen.

19. The method of claim 12 further comprising using liquid fuels, gaseous fuels, and air or vitiated air.

20. The method of claim 12 further comprising using liquid fuels, gaseous fuels, and oxygen.

21. The method of claim 12 further comprising using liquid fuels, air and oxygen or vitiated air and oxygen.

22. The method of claim 12 further comprising using gaseous fuels, air and oxygen, or vitiated air and oxygen.

23. The method of claim 13 wherein the oxidant comprises air and further comprising delivering air to the combustion air inlet by using at least one member from the group of a fan, blower and compressor.

24. The method of claim 12 wherein a high velocity gas stream is injected into the inlet end of one of the refractory passages.

25. The method of claim 24 wherein the high velocity gas stream comprises air which is combined with liquid fuel prior to being injected into the refractory passage.

26. The method of claim 24 wherein the high velocity gas stream comprises air and liquid fuel is not supplied to the liquid fuel inlet.

27. A kit for repair of a combustion device as in claim 1, the kit comprising a refractory block, an oil lance configured to be inserted into one of the passages, oil plug configured to seal the liquid fuel inlet, oxygen plug configured to seal the oxygen inlet, a natural gas plug configured to seal the gaseous fuel inlet, an air connection assembly configured to connect to the combustion air inlet, an air connection plug configured to seal the combustion air inlet, an aspirating air lance configured to deliver oil to the liquid fuel inlet, gaskets, and quick connect fittings.

* * * * *

UNITED STATES PATENT AND TRADEMARK OFFICE
CERTIFICATE OF CORRECTION

| | | |
|---|---|---|
| PATENT NO. | : 8,727,767 B2 | Page 1 of 1 |
| APPLICATION NO. | : 12/688115 | |
| DATED | : May 20, 2014 | |
| INVENTOR(S) | : Matthew James Watson et al. | |

It is certified that error appears in the above-identified patent and that said Letters Patent is hereby corrected as shown below:

In the Claims:

Column 10, Line 45

In claim 1 delete the words "at least-"

Signed and Sealed this
Twenty-eighth Day of October, 2014

Michelle K. Lee
*Deputy Director of the United States Patent and Trademark Office*